(12) United States Patent
Stuerke

(10) Patent No.: US 8,307,789 B2
(45) Date of Patent: Nov. 13, 2012

(54) RETRACTABLE LEASH SUPPORT

(76) Inventor: Steven T. Stuerke, Columbia, MO (US)

( * ) Notice: Subject to any disclaimer, the term of this patent is extended or adjusted under 35 U.S.C. 154(b) by 235 days.

(21) Appl. No.: 12/453,481

(22) Filed: May 12, 2009

(65) Prior Publication Data

US 2009/0301403 A1 Dec. 10, 2009

Related U.S. Application Data

(60) Provisional application No. 61/129,156, filed on Jun. 6, 2008.

(51) Int. Cl.
*A01K 1/04* (2006.01)

(52) U.S. Cl. .......................... 119/791; 119/780; 119/789

(58) Field of Classification Search .......... 119/786–789, 119/780, 791, 704, 703
See application file for complete search history.

(56) References Cited

U.S. PATENT DOCUMENTS

| | | | |
|---|---|---|---|
| 2,437,786 A | 3/1948 | Oberdorf et al. | |
| 2,551,540 A * | 5/1951 | Johnson | 119/786 |
| 2,725,853 A | 6/1955 | Nordheim | |
| 3,123,052 A | 3/1964 | Marshall | |
| 4,796,566 A * | 1/1989 | Daniels | 119/789 |
| 5,732,659 A * | 3/1998 | Wiggins | 119/787 |
| 5,957,092 A | 9/1999 | Colsch | |
| 6,318,302 B1 | 11/2001 | Bedient | |
| 6,328,046 B2 * | 12/2001 | Doreste | 135/15.1 |
| 6,523,500 B1 | 2/2003 | Zenteno | |
| 6,612,263 B2 | 9/2003 | Scheid et al. | |
| 6,820,573 B1 | 11/2004 | McMullin | |
| 7,353,780 B2 * | 4/2008 | Bean | 119/786 |
| 7,866,282 B2 * | 1/2011 | Simpson et al. | 119/781 |
| 2007/0137588 A1 | 6/2007 | Bean | |

* cited by examiner

*Primary Examiner* — Son T Nguyen
*Assistant Examiner* — Kathleen Iwasaki
(74) *Attorney, Agent, or Firm* — Richard C. Litman

(57) ABSTRACT

The retractable leash support includes a bracket mounted on a rotatable platform the rotatable platform being mountable to any fixed structure. The bracket has two extension tubes spaced for receiving the grip portion of a typical retractable pet leash, the extension tubes also being adapted to accommodate a plate having complementary tubes that fit over the extension tubes to secure the pet leash between the bracket and plate. The extension tubes and complementary tubes of the plate have holes that can be aligned. Pins are inserted into the aligned holes to lock the pet leash grip securely in the leash support.

5 Claims, 4 Drawing Sheets

RETRACTABLE LEASH SUPPORT

CROSS-REFERENCE TO RELATED APPLICATION

This application claims the benefit of U.S. Provisional Patent Application Ser. No. 61/129,156, filed Jun. 6, 2008.

BACKGROUND OF THE INVENTION

1. Field of the Invention

The present invention relates to animal tethers and more specifically to rotating animal tethers.

2. Description of the Related Art

On many occasions, a pet owner may wish to secure his/her pet with a tether in a designated location. The tether should provide a quality, worry free, non-tangling method of restraining the dog. Moreover the tether should not become an eyesore, regardless of where it is deployed. Preferably, the device should have the capability of rotating 360° when attached to a pole, which is in an open area.

There should preferably be a 32-foot radius for the pet to roam. The device should not drag chain on the landscape where the device is deployed, and should not have to be removed when an owner is mowing lawn or doing other landscape maintenance in the deployment area.

Thus a retractable leash support solving the aforementioned problems is desired.

SUMMARY OF THE INVENTION

The retractable leash support includes a bracket mounted on a rotatable platform the rotatable platform being mountable to any fixed structure. The bracket has two extension tubes spaced for receiving the grip portion of a typical retractable pet leash, the extension tubes also being adapted to accommodate a plate having complementary tubes that fit over the extension tubes to secure the pet leash between the bracket and plate. The extension tubes and complementary tubes of the plate have holes that can be aligned. Pins are inserted into the aligned holes to lock the pet leash grip securely in the leash support.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
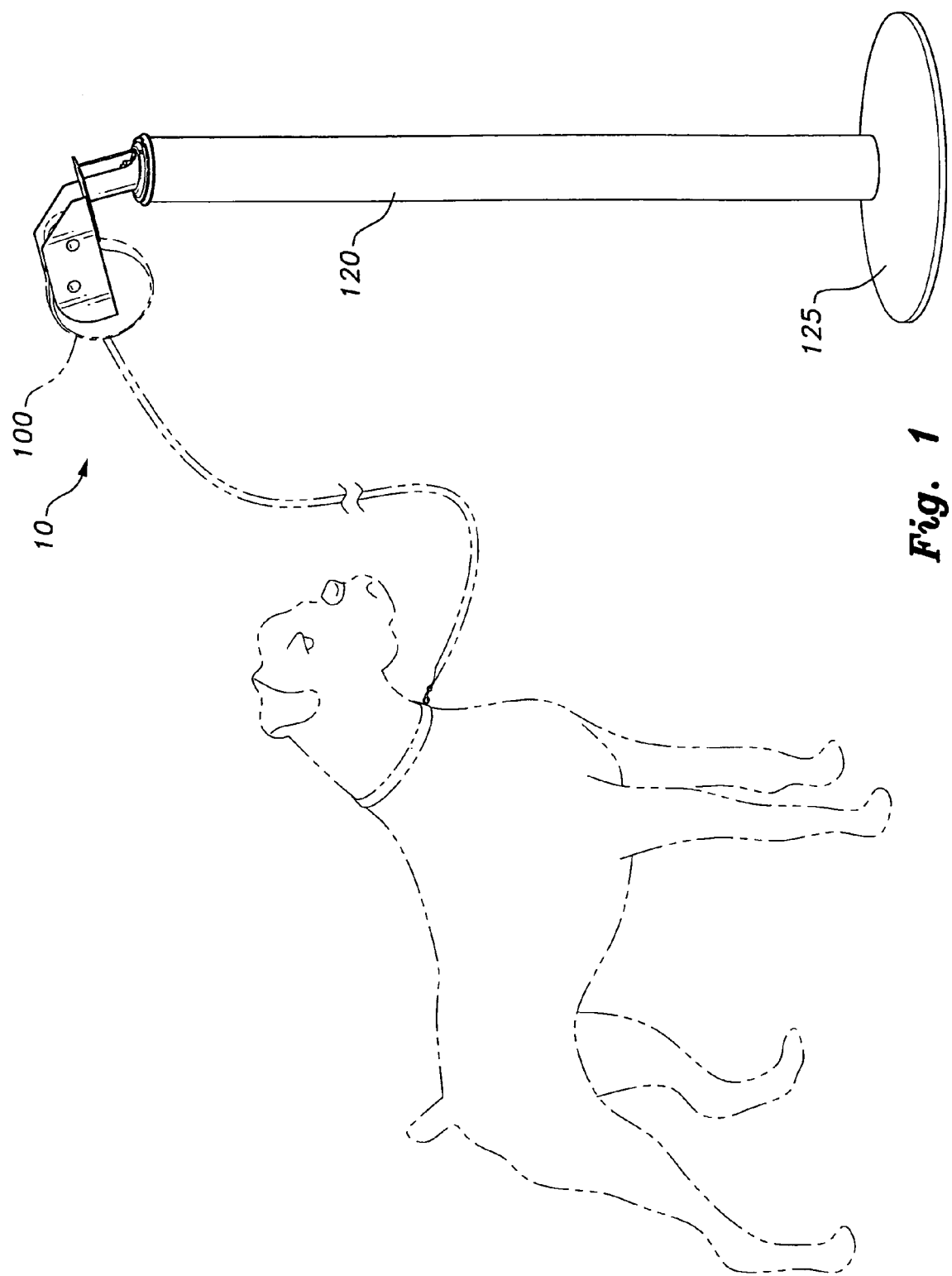
FIG. 1 is an environmental, perspective view of a retractable leash support according to the present invention.
Figure 2:
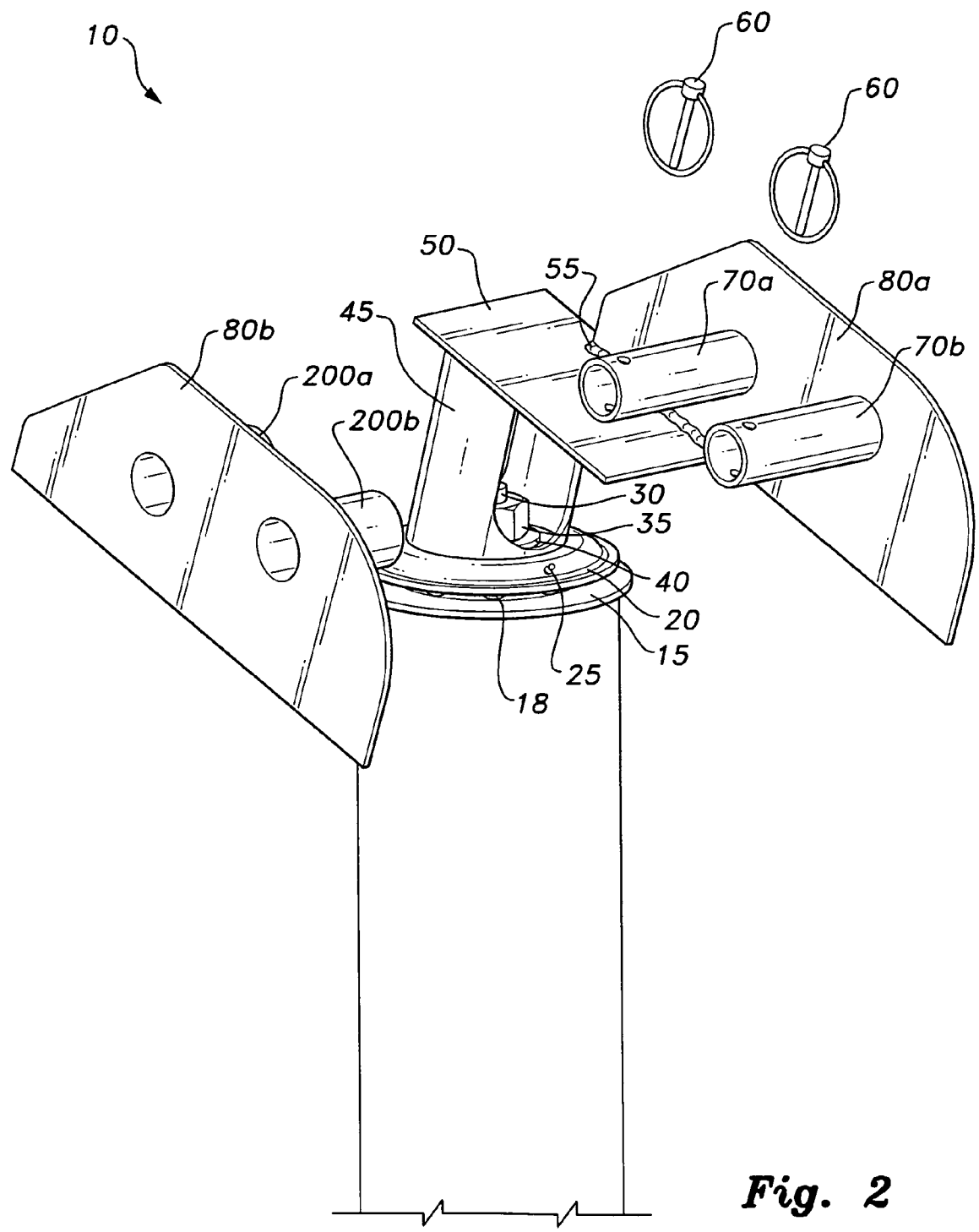
FIG. 2 is a partially exploded, perspective view of the retractable leash support according to the present invention.

As shown in FIGS. 1-4, the retractable leash support 10 includes a pet leash bracket 50 mounted on a rotatable platform, the rotatable platform being mountable to any fixed structure. The rotatable platform is comprised of a rotating disk 20 attached to a stationary disk 15 via an axial pin 30. Axial pin 30 may be disposed through a standoff nut 35 and washer 40. Ball bearings 18 are disposed between the stationary disk 15 and the rotating disk 20 to facilitate ease of rotation in the rotating disk 20. A grease fitting 25 may be disposed on rotating disk 20 to facilitate lubrication of the bearings 18.

Figure 3:
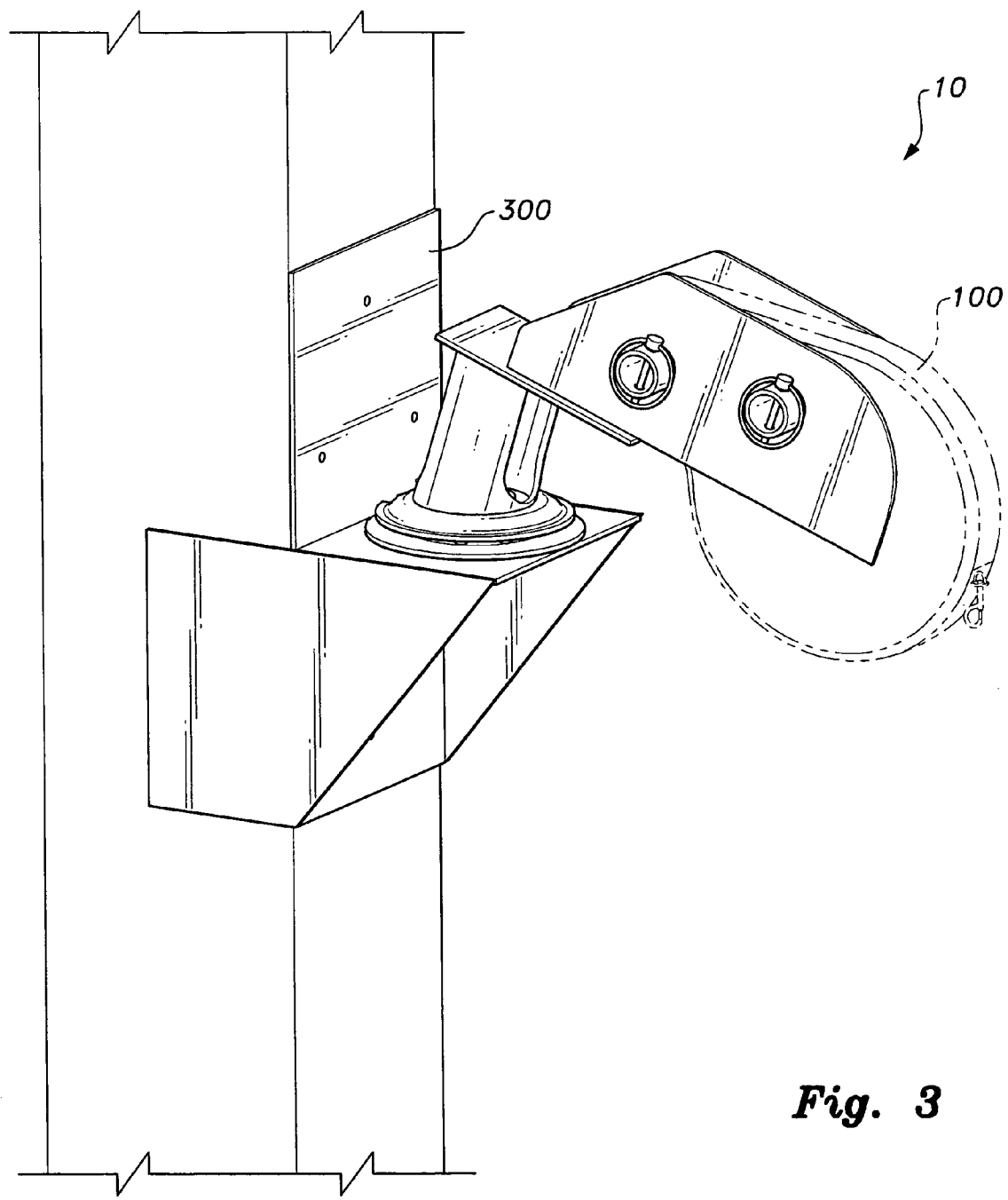
FIG. 3 is a perspective view of the retractable leash support using a first mounting option according to the present invention.
Figure 4:
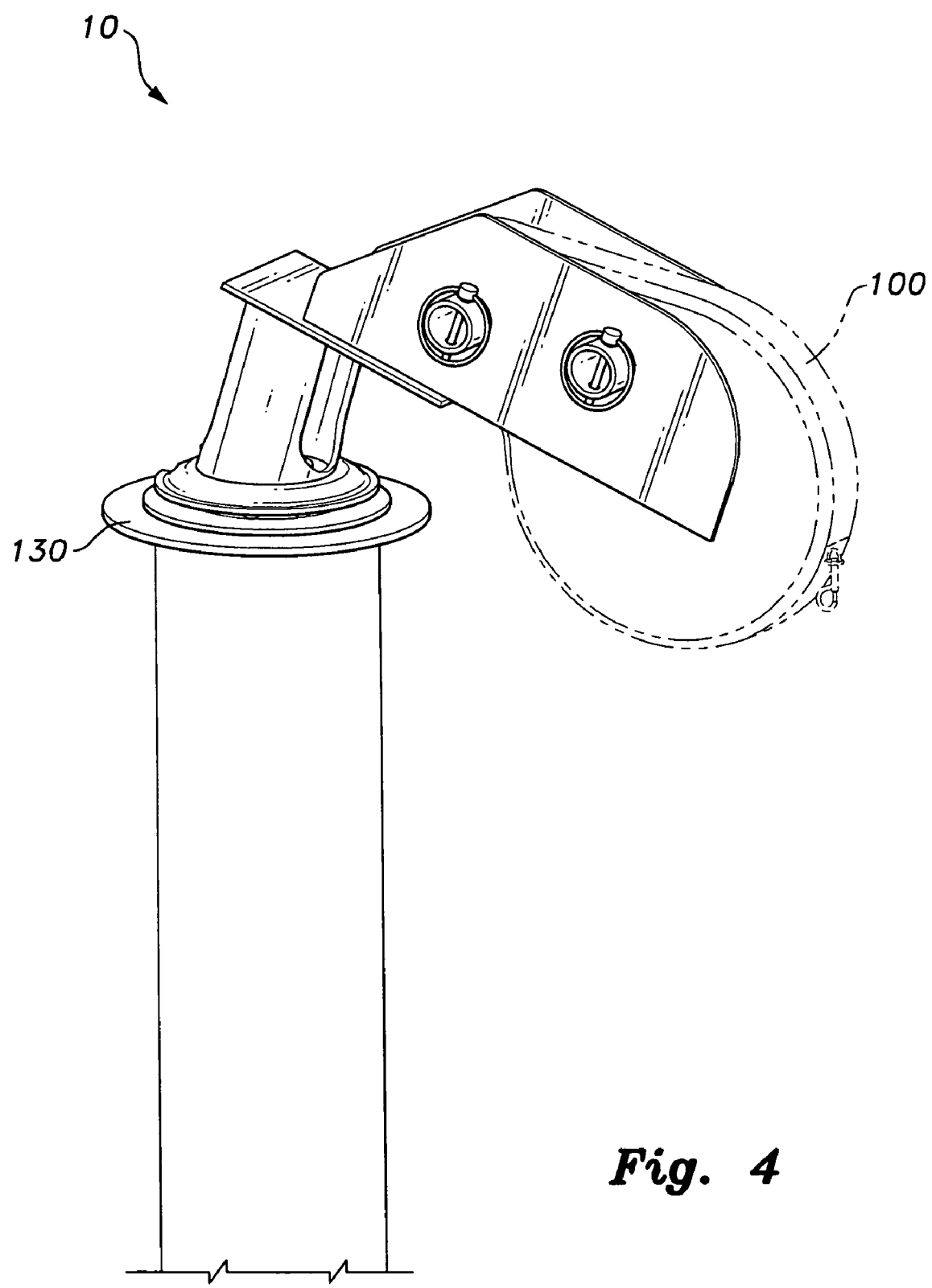
FIG. 4 is a perspective view of the retractable leash support using a second mounting option according to the present invention.

As most clearly shown in FIGS. 1 and 4, the stationary disk 15 of the rotatable platform can be mounted to a flange 130 of a pole 120, the pole having a sturdy base 125. Alternatively, as shown in FIG. 3, the stationary disk 15 of the rotatable platform can be mounted to an auxiliary bracket 300, the auxiliary bracket 300 being affixed to, e.g., a post or beam. Mounting is not restricted to a post or beam, and the option to mount on various structure types depends only on the design choice of, e.g., auxiliary bracket 300 and the requirement that auxiliary bracket 300 have mounting hardware allowing the stationary disk 15 of the rotatable platform to be secured to the auxiliary bracket 300. For example, auxiliary bracket 300 could be adapted to mount retractable leash support 10 to a hitch ball of a recreational vehicle or, as shown in FIG. 3, auxiliary bracket 300 could be mounted to a post (the post being part of another structure, such as an outside deck, privacy fence, or the like).

Slightly angled, downward-projecting parallel attachment struts 45 extend from pet leash bracket 50 and are fastened to, welded, or otherwise affixed to the rotating disk 20. Vertical planar member 80*a* extends upward from the pet leash bracket 50 and may be unitarily constructed with the bracket 50 or may be a separate piece secured to the bracket 50 via a weld 55. Two extension tubes 70*a* and 70*b* extend horizontally from planar member 80*a* and are spaced for receiving the grip portion of a typical retractable pet leash 100, the extension tubes 70*a* and 70*b* also being adapted to accommodate a plate 80*b* having complementary tubes 200*a* and 200*b* that fit over the extension tubes 70*a* and 70*b* to secure the pet leash 100 between planar member 80*a* of the pet leash bracket 50 and plate 80*b*. The extension tubes 70*a* and 70*b* and complementary tubes 200*a* and 200*b* have holes that can be aligned. Pins 60 are inserted into the aligned holes to lock the pet leash grip securely in the leash support 10.

It is to be understood that the present invention is not limited to the embodiment described above, but encompasses any and all embodiments within the scope of the following claims.

I claim:

1. A retractable leash support, comprising:
    a rotatable platform adapted for mounting on a supporting structure, the rotatable platform having;
        i) a stationary disk;
        ii) a rotating disk attached in axial alignment with the stationary disk; and
        iii) bearings disposed between the stationary disk and the rotating disk;
    a bracket fixedly mounted on the rotatable platform and extending upwardly therefrom, the bracket being rotatable with the rotatable platform;
    a planar member extending upwardly from the bracket, the planar member being fixedly attached to the bracket and supporting extension tubes extending from the planar member, the extension tubes being adapted for receiving a grip portion of retractable pet leash;
    a movable plate;
    complementary tubes extending from the movable plate, the complementary tubes being telescopically mounted to the extension tubes to secure the retractable pet leash between the planar member and the movable plate; and a securing means securing the extension tubes and the complementary tubes together and thereby locking the grip portion of the retractable pet leash the retractable leash support.

2. The retractable leash support according to claim 1, further comprising a pole, said rotatable platform being mounted on the pole.

3. The retractable leash support according to claim 1, wherein the retractable leash support is mountable to a beam.

4. The retractable leash support according to claim 1, wherein the securing means includes alignment holes disposed in the extension tubes and the complementary tubes and a pin insertable into the alignment holes to lock the grip portion of the retractable pet leash on the retractable leash support.

5. The retractable leash support according to claim 1, wherein the bracket includes parallel attachment struts fastened to the rotating disk.

* * * * *